E. PROUTY.
CAR TRUCK.
APPLICATION FILED JAN. 24, 1907.
921,455.
Patented May 11, 1909.
2 SHEETS—SHEET 1.
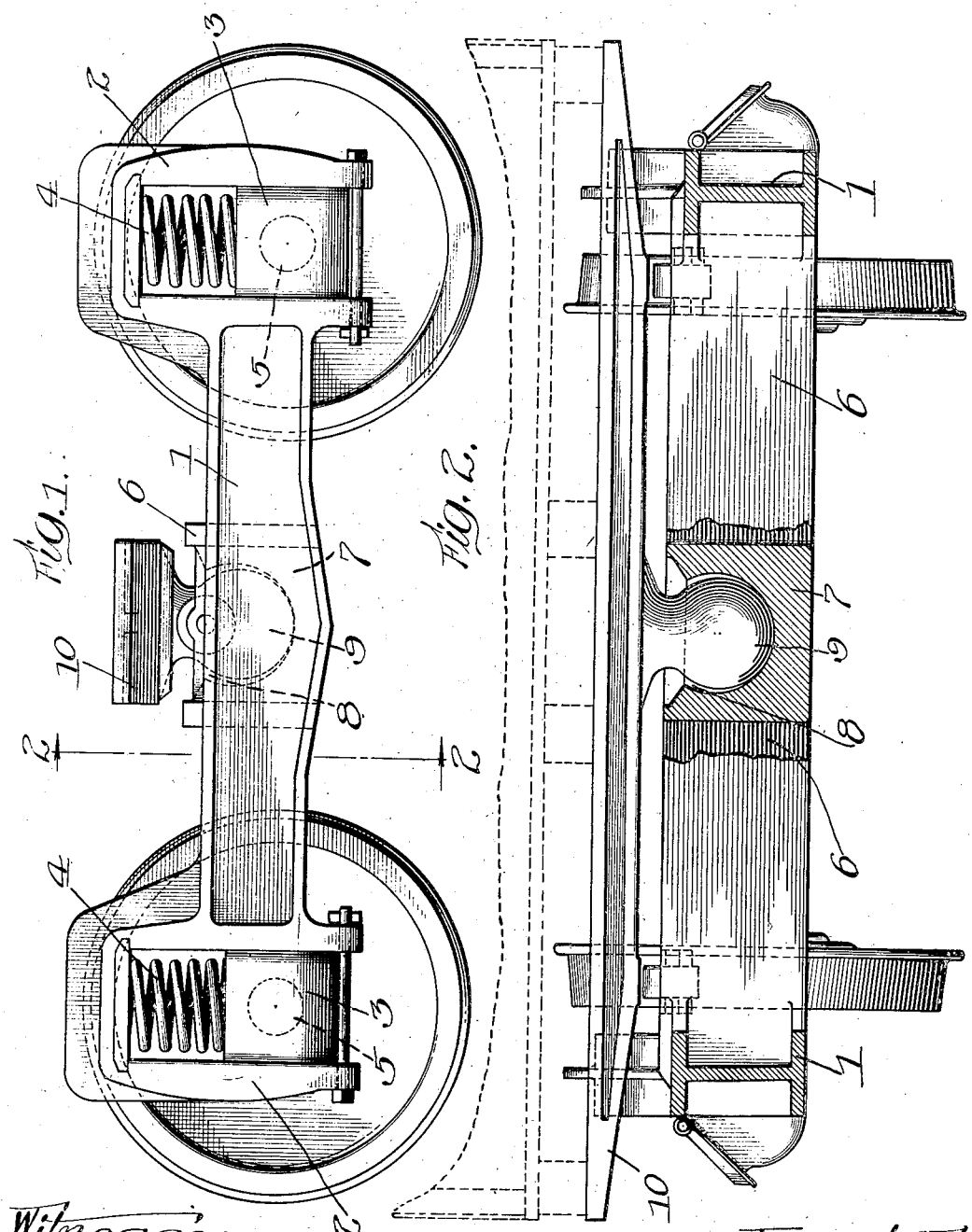

E. PROUTY.
CAR TRUCK.
APPLICATION FILED JAN. 24, 1907.
921,455.
Patented May 11, 1909.
2 SHEETS—SHEET 2.
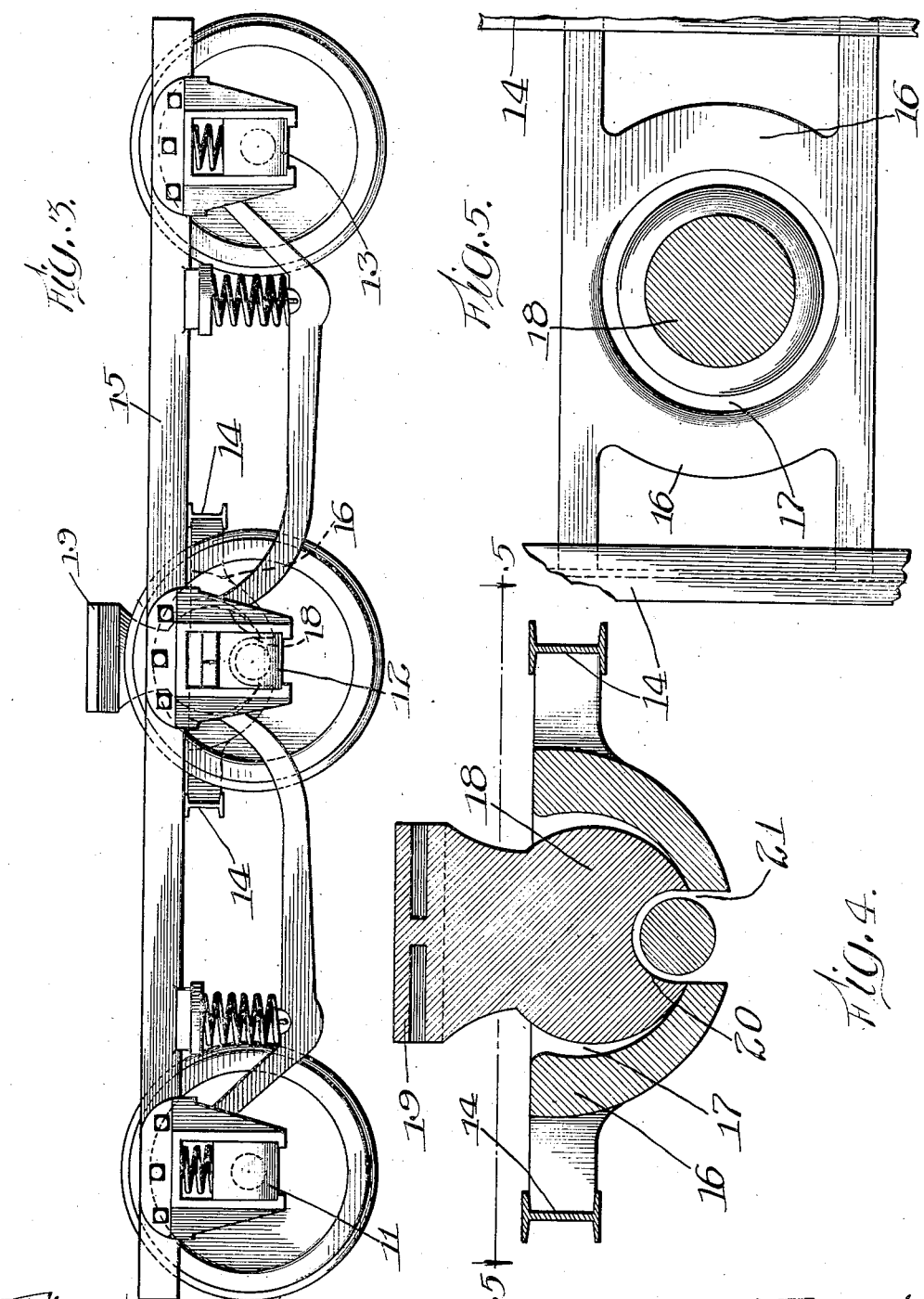

UNITED STATES PATENT OFFICE.

ENOCH PROUTY, OF CHICAGO, ILLINOIS.

CAR-TRUCK.

No. 921,455.　　　　Specification of Letters Patent.　　　Patented May 11, 1909.

Application filed January 24, 1907. Serial No. 353,886.

*To all whom it may concern:*

Be it known that I, ENOCH PROUTY, a citizen of the United States, residing at Chicago, in the county of Cook and State of Illinois, have invented new and useful Improvements in Car-Trucks, of which the following is a full, clear, concise, and exact description, reference being had to the accompanying drawing, forming a part of this specification.

My invention relates to improvements in trucks for vehicles and has particular relation to trucks adapted for use in connection with railway cars.

One of the objects of my invention is to provide a truck in which the vibrations, incident to the wheels of the truck passing over irregularities in the road, are decreased to the minimum.

By the present manner of mounting car bodies upon trucks the car is supported at a point which is the apex of a triangle having the corners of its base resting upon the outer axles of the truck. As a result when the front wheels of the truck strike a raise in the track as the car is moving forward, the raising of the wheels throws the point of support rearward against the forward movement of the body, causing serious vibrations or shocks to the car body.

My invention by providing a means for supporting the car body at a point substantially in the same plane as the axles of the truck, decrease the jars, to which the body of the car is subjected, to the minimum.

For the purpose of disclosing my invention I have illustrated in the accompanying drawings one means for supporting car body in position.

In said drawings: Figure 1, shows a side elevation of a car truck. Fig. 2, is a transverse section taken on the line 2—2 of Fig. 1. Fig. 3, is side elevation of car truck having six wheels. Fig. 4, is a detailed section of the supporting device used in connection with a six wheel truck, and—Fig. 5, is a horizontal sectional view on the line 5—5 of Fig. 4.

In carrying out the form of invention illustrated in the accompanying drawing, and having particular reference to Figs. 1 and 2, the car truck may be of the usual construction, provided with side beams 1 at either end of which is arranged a journal-box support 2 in which is carried the journal-box 3; a coiled spring 4 being interposed between the journal-box and the support to take up some of the jar of the wheels. The ends of the axles 5 of the wheels are mounted in the journal-boxes 4 as is customary in such devices. At a point intermediate of the wheels and preferably formed integrally with the side members 1 are a pair cross members 6 which extend from one side member to the other. At a central point in the frame thus formed, preferably integral with the cross members 6, is a block 7 having formed therein a socket 8 of a ball and socket joint. The ball 9 of the joint is formed on the supporting beam 10 upon which is mounted the car body.

It will be noted that the bottom of the socket 8 is slightly below a line passing through the center of the axles 3 whereby the support for the car body is substantially in the same plane as are the axles of the car wheels. While I have shown the bottom of the socket 8 as being slightly below a line passing through the center of the axles, this position may be varied at will within narrow limits and it will be understood that I contemplate the placing of my support either in the position shown or slightly above or below the axles as reason may dictate. I do not intend to limit my invention to the arrangement of the support of the car body at the precise point indicated in the drawing.

In the structure illustrated in Figs. 3 to 5 I have shown my invention as applied to six wheel trucks. In this structure the body of the truck is provided with three pairs of journal-boxes 11, 12, and 13 in which operate the axles of three pairs of wheels. On either side of the center wheels of the truck are arranged a pair of cross bars 14 corresponding to the cross bars 6 of the two wheel truck and centrally in the frame, formed by the side members 15 of the truck and the cross bars 14, a socket block 16 is arranged. This socket block may be secured in position in any desired manner, but I have herein illustrated it as being cast a part of the cross bars 14. Formed in the block 16 is a socket 17 substantially similar to the socket 8 illustrated in Figs. 1 and 2 and which is arranged to receive the ball 18 depending on the cross beams 10 upon which the car body rests. The ball 18 is cut away at 20 and the block 16 is cut away at 21 to accommodate the center axle, as shown.

While I have described and shown certain forms of my invention, it will be understood that various changes may be made therein without departing from the spirit of my invention as set forth in the appended claims.

Having thus described my invention what I claim as new and desire to secure by Letters Patent is:

1. The combination with a car body, of a truck therefor, and a universal joint for connecting said body with said truck, the supporting point for said body being in substantially the same plane as the plane of the axles.

2. The combination with a car body, of a truck therefor, and a universally pivotal support for the body, the supporting point of which is substantially in the plane of the axles.

3. The combination with a car body, of a track therefor, and a universally oscillating support for the body, the supporting point of which is substantially in the plane of the axles.

4. The combination with a car body, of a truck therefor, and a universal joint for connecting said body with said truck, the supporting point of which is in a plane slightly below a plane passing through the center of the axles.

5. A car-truck carried on wheels and having a universally pivotal support for the body of the car arranged between pairs of wheels, the point of support lying substantially in the plane of the wheel-axles.

6. The combination with a car body, of a six wheel truck, a member carried by said body and adapted to rest upon a support carried by the truck, the supporting point of which is at a point substantially in the plane of the axles, said member being so constructed as to accommodate the center axle of the truck.

7. The combination with a car body, of a truck therefor, a universal joint for connecting said body with said truck, the supporting point of said joint being in the plane of the axles of the truck, one of the members of said joint being connected to the car and the other member being carried by the truck, the member carried by the car being constructed to fit over one of the axles of the truck, and the other member also being constructed to accommodate the normal position of the car axle.

8. The combination with a car body, of a truck therefor, a universal joint connecting said car body and truck and providing a supporting means therefor, the supporting point of said joint being substantially in the plane of said axles, one member of said joint being connected to the car body and having a cut away portion to accommodate the axles of the truck, the other member being carried by the car truck and also having a cut away portion to accommodate the axles.

9. The combination with a car body, of a truck therefor, and a ball and socket joint for connecting said body with said truck, the supporting point for the body being in substantially the same plane as the plane of the axles.

10. The combination with a car body, of a truck therefor, and a joint capable of pivotally operating in a substantially longitudinal vertical plane for connecting said body with said truck, the supporting point for the body being in substantially the same plane as the plane of the axles.

11. The combination with a car body, of a truck therefor, and a pivotal joint for connecting said body with said truck, said joint being capable of operation in a substantially longitudinal vertical plane and the supporting point for said body being in substantially the same plane as the plane of the axles.

12. The combination with a car body, of a truck therefor, and an oscillating support for said body, said support being capable of operation in a substantially longitudinal vertical plane and the supporting point for the body being substantially in the plane of the axles.

13. The combination with a car body, of a truck therefor, and a swinging joint for connecting said body with said truck, said joint being capable of operation in a substantially longitudinal vertical plane and the supporting point for said body being in a plane slightly below a plane passing through the center of the axles.

In witness whereof, I have hereunto subscribed my name in the presence of two witnesses.

ENOCH PROUTY.

Witnesses:
M. R. ROCHFORD,
W. PERRY HAHN.